(12) United States Patent
Javaheripi et al.

(10) Patent No.: US 11,625,614 B2
(45) Date of Patent: Apr. 11, 2023

(54) SMALL-WORLD NETS FOR FAST NEURAL NETWORK TRAINING AND EXECUTION

(71) Applicant: The Regents of the University of California, Oakland, CA (US)

(72) Inventors: Mojan Javaheripi, San Diego, CA (US); Farinaz Koushanfar, San Diego, CA (US); Bita Darvish Rouhani, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 757 days.

(21) Appl. No.: 16/661,226

(22) Filed: Oct. 23, 2019

(65) Prior Publication Data
US 2020/0125960 A1 Apr. 23, 2020

Related U.S. Application Data

(60) Provisional application No. 62/749,609, filed on Oct. 23, 2018.

(51) Int. Cl.
*G06N 3/10* (2006.01)
*G06N 3/04* (2006.01)
*G06F 16/901* (2019.01)

(52) U.S. Cl.
CPC ........... *G06N 3/10* (2013.01); *G06F 16/9024* (2019.01); *G06N 3/04* (2013.01)

(58) Field of Classification Search
CPC ............ G06N 3/10; G06N 3/04; G06N 20/00; G06N 3/0454; G06N 3/088; G06N 3/08; G06F 16/9024

USPC .............................................. 706/13, 47, 44
See application file for complete search history.

(56) References Cited

U.S. PATENT DOCUMENTS

2015/0363689 A1\* 12/2015 Markram ................. G06N 3/08
706/27
2019/0377792 A1\* 12/2019 Zhang .................... G06N 5/022

OTHER PUBLICATIONS

Bair/bvlc alexnet model.URL https://github.com/ BVLC/caffe/tree/master/models/bvlc_ alexnet.
Barahona, M.and Pecora, L.M.Synchronization in small-world systems. Physical review letters, 89(5):054101, 2002.
Chollet, F.et al.Keras.https://keras.io, 2015.
Cortes, C., Gonzalvo, X., Kuznetsov, V., Mohri, M., and Yang, S.Adanet: Adaptive structural learning of artificial neural networks. arXiv preprint arXiv:1607.01097, 2016.
(Continued)

*Primary Examiner* — Evan Aspinwall
(74) *Attorney, Agent, or Firm* — Mintz Levin Cohn Ferris Glovsky and Popeo, P.C.

(57) ABSTRACT

A method, a system, and a computer program product for fast training and/or execution of neural networks. A description of a neural network architecture is received. Based on the received description, a graph representation of the neural network architecture is generated. The graph representation includes one or more nodes connected by one or more connections. At least one connection is modified. Based on the generated graph representation, a new graph representation is generated using the modified at least one connection. The new graph representation has a small-world property. The new graph representation is transformed into a new neural network architecture.

20 Claims, 10 Drawing Sheets

(56) References Cited

OTHER PUBLICATIONS

Dean, J., Corrado, G., Monga, R., Chen, K., Devin, M., Mao, M., Senior, A., Tucker, P., Yang, K., Le, Q.V., et al.Large scale distributed deep networks. In Advances in neural information processing systems, pp. 1223-1231, 2012.

Deng, J., Dong, W., Socher, R., Li, L.-J., Li, K., and Fei-Fei, L.Imagenet: A large-scale hierarchical image database. In Computer Vision and Pattern Recognition, 2009. CVPR 2009. IEEE Conference on, pp. 248-255.Ieee, 2009.

Deng, L., Yu, D., et al.Deep learning: methods and applications. *Foundations and Trends® in Signal Processing*, 7(3-4):197-387, 2014.

Erkaymaz, O., Ozer, M., and Perc, M.Performance of small-world feedforward neural networks for the diagnosis of diabetes. Applied Mathematics and Computation, 311: 22-28, 2017.

Faust, O., Hagiwara, Y., Hong, T. J., Lih, O. S., and Acharya, U. R. Deep learning for healthcare applications based on physiological signals: a review. Computer methods and programs in biomedicine, 2018.

Gu, J., Wang, Z., Kuen, J., Ma, L., Shahroudy, A., Shuai, B., Liu, T., Wang, X., Wang, G., Cai, J., et al. Recent advances in convolutional neural networks. Pattern Recognition, 77:354-377, 2018.

He, K., Zhang, X., Ren, S., and Sun, J. Deep residual learning for image recognition. In Proceedings of the IEEE conference on computer vision and pattern recognition, pp. 770-778, 2016a.

He, K., Zhang, X., Ren, S., and Sun, J. Identity mappings in deep residual networks. In European conference on computer vision, pp. 630-645. Springer, 2016b.

Huang, G., Sun, Y., Liu, Z., Sedra, D., and Weinberger, K. Q. Deep networks with stochastic depth. In European Conference on Computer Vision, pp. 646-661. Springer, 2016.

Huang, G., Liu, Z., Van Der Maaten, L., and Weinberger, K. Q. Densely connected convolutional networks. In CVPR, vol. 1, pp. 3, 2017.

Humphries, M. D. and Gurney, K. Network small-world-ness: a quantitative method for determining canonical network equivalence. PloS one, 3(4):e0002051, 2008.

Krizhevsky, A., Nair, V., and Hinton, G. Cifar-10 (Canadian institute for advanced research). URL http://www. cs.toronto.edu/kriz/cifar. html.

Krizhevsky, A., Sutskever, I., and Hinton, G. E. Imagenet classification with deep convolutional neural networks. In Advances in neural information processing systems, pp. 1097-1105, 2012.

Kuperman, M. and Abramson, G. Small world effect in an epidemiological model. Physical Review Letters, 86(13): 2909, 2001.

Latora, V. and Marchiori, M. Efficient behavior of small-world networks. Physical review letters, 87(19):198701, 2001.

LeCun, Y. The mnist database of handwritten digits. http://yann.lecun.com/exdb/mnist/, 1998.

Lv, Y., Duan, Y., Kang, W., Li, Z., Wang, F.-Y., et al. Traffic flow prediction with big data: A deep learning approach. IEEE Trans. Intelligent Transportation Systems, 16(2): 865-873, 2015.

Olfati-Saber, R. Ultrafast consensus in small-world networks. In American Control Conference, 2005. Proceedings of the 2005, pp. 2371-2378. IEEE, 2005.

Paszke, A., Gross, S., Chintala, S., Chanan, G., Yang, E., DeVito, Z., Lin, Z., Desmaison, A., Antiga, L., and Lerer, A. Automatic differentiation in pytorch. 2017.

Rouhani, B. D., Mirhoseini, A., and Koushanfar, F. Deep3: Leveraging three levels of parallelism for efficient deep learning. In Proceedings of the 54th Annual Design Automation Conference 2017, pp. 61. ACM, 2017.

Shazeer, N., Mirhoseini, A., Maziarz, K., Davis, A., Le, Q., Hinton, G., and Dean, J. Outrageously large neural networks: The sparsely-gated mixture-of-experts layer. arXiv preprint arXiv:1701.06538, 2017.

Simonyan, K. and Zisserman, A. Very deep convolutional networks for large-scale image recognition. arXiv preprint arXiv:1409.1556, 2014.

Smith, L. N. Cyclical learning rates for training neural networks. In Applications of Computer Vision (WACV), 2017 IEEE Winter Conference on, pp. 464-472. IEEE, 2017.

Srivastava, R. K., Greff, K., and Schmidhuber, J. Highway networks. arXiv preprint arXiv:1505.00387, 2015.

Strogatz, S. H. Exploring complex networks. nature, 410 (6825):268, 2001.

Szegedy, C., Liu, W., Jia, Y., Sermanet, P., Reed, S., Anguelov, D., Erhan, D., Vanhoucke, V., and Rabinovich, A. Going deeper with convolutions. *In Proceedings of the IEEE conference on computer vision and pattern recognition*, pp. 1-9, 2015.

Szegedy, C., Ioffe, S., Vanhoucke, V., and Alemi, A. A. Inception-v4, inception-resnet and the impact of residual connections on learning. *In AAAI*, vol. 4, pp. 12, 2017.

Tahbaz-Salehi, A. and Jadbabaie, A. Small world phe-nomenon, rapidly mixing markov chains, and average consensus algorithms. *In Decision and Control*, 2007 46th IEEE Conference on, pp. 276-281. IEEE, 2007.

Targ, S., Almeida, D., and Lyman, K. Resnet in resnet: generalizing residual architectures. arXiv preprint arXiv:1603.08029, 2016.

Watts, D. J. and Strogatz, S. H. Collective dynamics of small-worldnetworks. nature, 393(6684):440, 1998.

Zanette, D. H. Dynamics of rumor propagation on small-world networks. *Physical review E*, 65(4):041908, 2002.

Zeiler, M. D. Adadelta: an adaptive learning rate method. arXiv preprint arXiv:1212.5701, 2012.

Zhang, X., Moore, C., and Newman, M. E. Random graph models for dynamic networks. *The European Physical Journal B*, 90(10):200, 2017.

\* cited by examiner

Input: baseline model $G$, rewiring probability $p$
Output: rewired network $G_{rwd}$ $G_{rwd} \leftarrow G$
for $l = 1$ to $(L-2)$ do
  for $v_i$ in $Layer[l]$ do
    for $v_j$ in $Layer[l+1]$ do
      if $|E_{l,l+1}| \geq 1$ and $e(v_i, v_j) \in G_{rwd}$ then
        generate random number $r \in [0, 1]$
        if $r \leq p$ then
          $G_{rwd} \leftarrow \{G_{rwd} - e(v_i, v_j)\}$
          repeat
            choose $v_{j'} \in \{Layer[l+2], ..., Layer[L]\}$
          until $e(v_i, v_{j'}) \notin G_{rwd}$
          $G_{rwd} \leftarrow \{G_{rwd} + e(v_i, v_{j'})\}$
        end if
      end if
    end for
  end for
end for

FIG. 3b

SMALL-WORLD NETS FOR FAST NEURAL NETWORK TRAINING AND EXECUTION

CROSS-REFERENCE TO RELATED APPLICATIONS

The present application claims priority to U.S. Provisional Patent Appl. No. 62/749,609 to Javaheripi et al., filed Oct. 23, 2018, and entitled "Small-World Nets For Fast Deep Neural Network Training And Execution," and incorporates its disclosure herein by reference in its entirety.

TECHNICAL FIELD

This disclosure relates generally to data processing and, in particular, to fast training and/or execution of neural networks, where the training and/or execution of neural networks may occur on hardware platforms.

BACKGROUND

Deep learning (DL) models are becoming increasingly popular for various learning tasks, particularly in visual computing applications. An advantage for DL is that it can automatically learn the relevant features by computing on a large corpus of data, thus, eliminating the need for hand-selection of features common in traditional methods. In the contemporary big data realm, visual datasets are increasingly growing in size and variety. To increase inference accuracy on such challenging datasets, DL models are evolving towards higher complexity architectures. State-of-the-art models tend to reach good accuracy, but they suffer from a dramatically high training cost.

As DL models grow deeper and more complex, the large number of stacked layers gives rise to a variety of problems, e.g., vanishing gradients, which renders the models hard to train. To facilitate convergence and enhance the gradient flow for deeper models, creation of bypass connections was recently suggested. These shortcuts connect the layers that would otherwise be disconnected in a traditional Convolutional Neural Network (CNN). To curtail the cost of hand-crafted DL architecture exploration, the existing systems typically realize the shortcuts by replicating the same building block throughout the network. However, such repeated pattern of blocks in these networks induces unnecessary redundancies that increase the computational overhead. Thus, there is a need for transforming the topology of conventional CNNs such that they reach optimal cross-layer connectivity.

SUMMARY

In some implementations, the current subject matter relates to a computer-implemented method for fast training and/or execution of neural networks. The method may include receiving a description of a neural network architecture, generating, based on the received description, a graph representation of the neural network architecture, the graph representation including one or more nodes connected by one or more connections, modifying at least one connection, generating, based on the generated graph representation, a new graph representation using the modified connection, where the new graph representation has a small-world property, and transforming the new graph representation into a new neural network architecture.

In some implementations, the current subject matter may include one or more of the following optional features. In some implementations, the modification of connections may be executed based on a predetermined probability (e.g., a measure in a graph theory). The probability may be selected in an interval between 0 and 1.

The method may further include repeating the modifying for each connection in the one or more connections, and generating the new graph presentation having a maximum small-world property selected from a plurality of small-world properties determined for each new graph representation based on the repeating for a plurality of probabilities in the interval between 0 and 1. In some implementations, the description of the neural network architecture may include a plurality of layers having a plurality of neurons. Each neuron may correspond to a node in the generated graph representation and the connections may include connections between one or more layers in the plurality of layers.

In some implementations, a connection may be between a first input node and a first output node in the plurality of nodes. The modified connection may be between the first input node and a second output node in the plurality of nodes. The modified connection may be longer than the original connection. The modified connection may be selected using the predetermined probability and one or more constraints.

In some implementations, the new neural network architecture may correspond to a small-world neural network. Further, a total number of the connections in the graph representation may be equal to a total number of connections in the new graph representation.

In some implementations, an application programming interface may be configured to perform at least one of the receiving, the generating the graph representation, the modifying, the generating the new graph representation, and the transforming.

Implementations of the current subject matter can include systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein may be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3b illustrates an exemplary code that may be used to execute the rewiring process shown in FIG. 3a, according to some implementations of the current subject matter;

DETAILED DESCRIPTION

Figure 1:
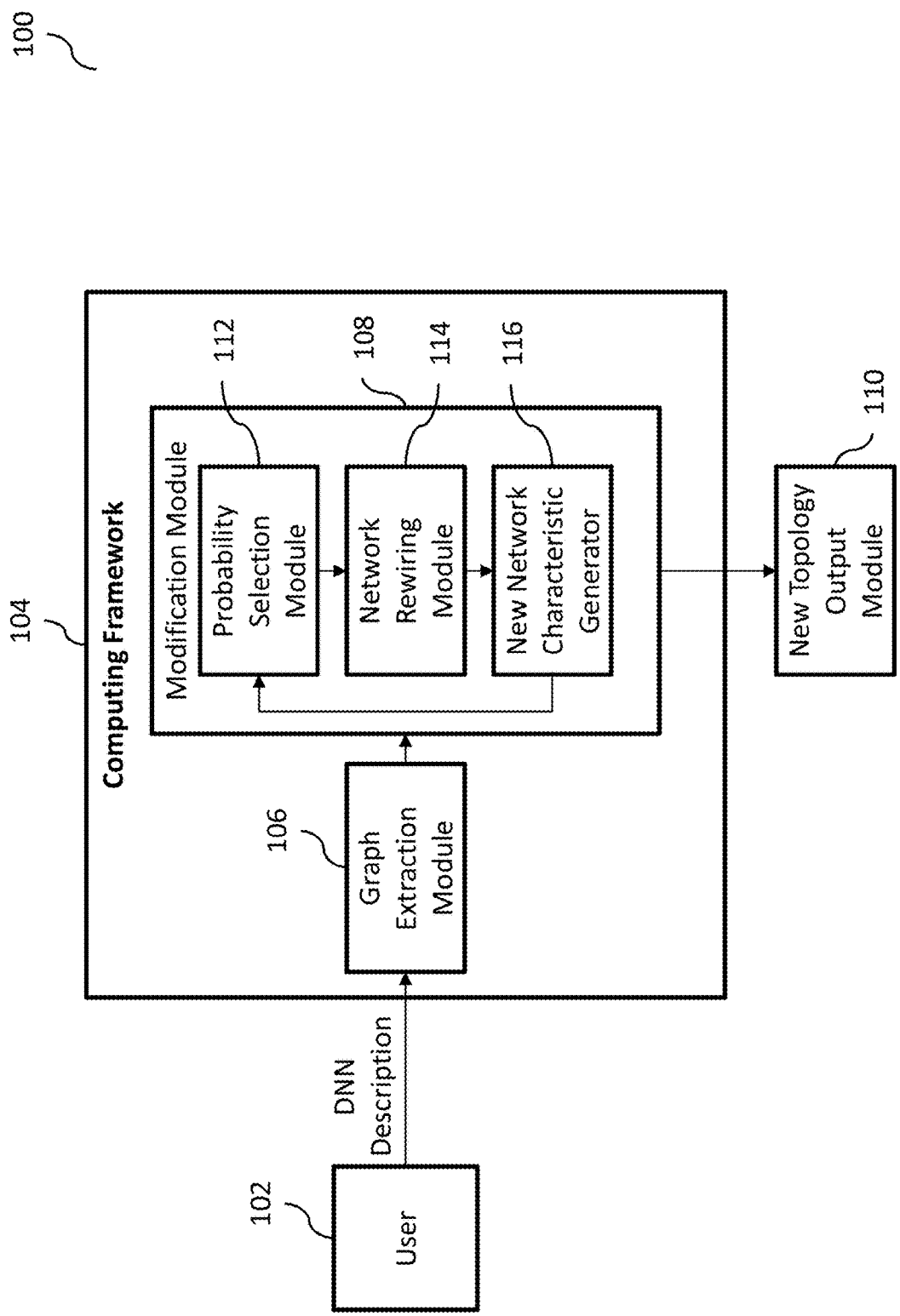
FIG. 1 illustrates an exemplary system for transforming neural networks into small-world networks for fast neural network training and execution, according to some implementations of the current subject matter

To address these and potentially other deficiencies of currently available solutions, one or more implementations of the current subject matter relate to methods, systems, articles of manufacture, and the like that can, among other possible advantages, provide an ability for fast neural network training and execution.

With the growing range of applications for deep neural networks (DNNs), the demand for higher accuracy has directly impacted the depth of the state-of-the-art models. Although deeper networks are shown to have higher accuracy, they suffer from drastically long training time and slow convergence speed. Over the past few decades, small-world networks have gained widespread attention for the study of complex networks and several theoretical and empirical evidence has demonstrated the superior convergence and computational power of small-world architectures.

One of the challenges associated with conventional DNNs relates to the silicon cost for training of DNNs. Current DNN training methods are iterative in nature and incur a dramatic resource cost. As network architectures grow deeper, the allocated training resources, e.g., the underlying hardware, as well as the training runtime required for the pertinent model to achieve the desired accuracy increases accordingly. Further, in real-life scenarios, the trained DNN may require to adaptively change in the face of new samples to cope with the imposed environmental changes (e.g., a speech recognition model that needs constant updating (fine-tuning) to comply with the new samples that differ in accent/tone from the previously seen dataset). In order to provide just-in-time service to clients, the underlying DNN must be carefully designed to minimize the adaptation time.

Additional challenges for DNN deployment arise from significant engineering cost of neural network design. Due to the empirical context of DNN training, their extensive success has been solely based on experimental evaluations, while the theoretical aspects are yet to be developed. As such, empirically identifying an optimal DNN architecture for a given task may require a thorough examination and multifarious trial and errors on different models. This introduces a high engineering cost as well as lowering the time-to-market for DNN-based intelligent applications.

Conventional approaches on accelerated training of DNNs have taken the following: 1) scaled-out (distributed) training that leverages hardware parallelism to train large-scale DNNs. Although this approach may reduce an overall training time, the allocated hardware resources may be significantly higher; 2) data subspace parallelism and graph traversal may be used to increase convergence speed, but does not modify the underlying DNN topology; and 3) architectural modification that introduces shortcut connections. However, these approaches are not adaptable to all network sizes and require very deep architectures, while suffering a high inefficiency for smaller networks. Further, these models are hard to train on inexpensive computing systems and require high training time for convergence.

Small-world networks have been used as a graph-processing tool to model many real-world phenomena, e.g., biological neural networks. In some implementations, the current subject matter relates to an automated framework that may convert any arbitrary neural network architecture into a small-world equivalent and transforming a newly generated small-world equivalent into a new neural network architecture. By this transformation, the current subject matter may be able to build small-world neural networks that may show orders of magnitude faster convergence speed during training while maintaining the state-of-the-art accuracy. The current subject matter may be configured as an end-to-end framework for transforming conventional feed-forward neural network architectures toward the small-world counterparts. By this transformation, the current subject matter may be configured to achieve orders of magnitude higher convergence speed during training compared to the baseline models. The current subject matter may also include an automated architecture modification tool that may modify any given neural network to enhance the small-world property (e.g., to tune the neural network graph between regularity and randomness) and may enable design of optimized neural network structures while eliminating a need for trial-and-error, thereby minimizing a non-recurring engineering cost.

In some implementations, the current subject matter may include an automated application programming interface (API) that may iteratively rewire connections within the provided network to find an optimal architecture that may possess a minimum mixing-time. In some implementations, the current subject matter does not, however, change the total number of connections within the network. As such, total number of parameters in the given neural network may remain constant while the removed connections may introduce sparsity in network parameter matrices that may be further leveraged to accelerate neural network inference/execution on specialized hardware.

In some implementations, the current subject matter may receive a baseline model that may include a description of a particular neural network (e.g., parameters, connections, etc.). The baseline model may then be converted into a undirected graph. The graph may include one or more vertices or nodes that may correspond to one or more neurons (e.g., a basic unit of computation in a neural network). The graph may also include one or more edges that may represent inter-layer connections. The generated undirected graph may then be modified through "rewiring" connections between nodes. Such rewiring may include connecting nodes to new nodes. The modification may include one or more of the following iterative processes. A rewiring probability [0, 1] (a measure characteristic in graph theory) in a plurality of probabilities may be selected. The probability close to 0 may represent a baseline graph, whereas a probability close to 1 may represent a highly random graph. Using the selected probability, the undirected graph may be randomly rewired, whereby one or more nodes may be disconnected from one or more previously connected nodes and connected to one or more new nodes. Further probabilities may be selected and the process of rewiring may be repeated. For each rewired network, the small-world characteristics of the graph are measured and an optimal topology may be selected among all rewired architectures. Then, a new architecture representative of a new small-world neural network that may include new descriptions of new layers, connections, etc. may be generated based on the obtained optimal graph topology.

FIG. 1 illustrates an exemplary system 100 for transforming neural networks into small-world networks for fast neural network training and execution, according to some implementations of the current subject matter. The system 100 may include a computing framework 104 that may include hardware, software, and/or any combination thereof, including, but not limited to one or more processors and/or one or more memory components. The framework 104 may be configured to receive a description of a neural network from a user 102 and may be configured to output a new neural network topology using an output module 110. The description of the neural network may be provided by the user 102 via one or more user interfaces, application programming interfaces, and/or any other means. The user 102 may include at least one of the following: computer processors, computing networks, software applications, servers, user interfaces, databases, storage locations, memory locations, and/or any combination of hardware and/or software components.

The framework 104 may be configured to include a graph extraction computing component or module 106 and a modification computing component or module 108. The graph extraction module 106 may be configured to receive a description of the neural network (e.g., one or more data files and/or collection of data files, etc.) from the user 102 and generate an undirected graph based on the description. The graph may include one or more nodes that may be connected via one or more edges. The edges may represent inter-layer connections in the baseline neural network.

The graph extraction module 106 may be configured to provide the generated graph to the automated architecture modification module 108. The modification module 108 may include a probability selection module 112, a network rewiring module 114, and a new network characteristic generator module 116. The probability selection module 112 may be configured to select a probability p in the interval [0, 1] and using that probability, the network rewiring module 114 may "rewire" the generated graph (e.g., create new connections, remove prior connections, etc. between nodes in the generated graph). The module 116 may then determine the small-world characteristics of the rewired network to ascertain an optimal network topology. After iterative rewiring using multiple probabilities p, the modification module 108 may select the optimal small-world topology for generation of a new, optimal neural network having a fast convergence by the output module 110.

In some implementations, the input to the computing framework 104 may be a high-level description of the user's desired neural network architecture, which may be also referred to as a baseline model. The framework 104 may then convert the network architecture to an undirected graph, where the vertices of the graph may represent neurons and edges may correspond to inter-layer connections. The generated graph representation may be provided to the modification module 108 to iteratively perform the following: 1) the neuron connections in the baseline graph may be randomly rewired using a probability p, 2) characteristics of the network required to distinguish a small-world graph from the regular/random counterparts may be stored, and 3) a new value of $p \in [0, 1]$ is selected. The module 108 may process all values of p and profiles of each randomly produced graphs and may output a network configuration, which may have small-world network properties.

The small-world networks incorporate one or more features of random networks and regular networks. Examples of small-world real-life networks include power networks in the western United States, neural network of animals, a network of actors who have played in the same movies, etc. Members of small-world network class may have dynamic properties that may be different from those of equivalent random and/or regular networks. They may have orders of magnitude improvement in signal propagation speed, computational power, and synchronization. Some of the characteristics of small-world networks may include small average distance between any two nodes. In particular, any two arbitrary nodes in a small-world network may be connected via a few vertices, which is a property inherited from random graphs. Small-world networks may also have a relatively high local clustering of elements, which is a characteristic that is not present in random graphs but is prominent in regular graphs.

The small-world networks property may be described in terms of two interactive graph qualities: 1) a characteristic path length (L) and 2) a global clustering coefficient (C). For a given graph, L may be calculated by taking an average of minimum path lengths over all node pairs, where the minimum path length may be equal to the smallest number of edges one must traverse to get from the first node to the second (or vice versa). The clustering coefficient may be a measure for interconnections between neighbors of a given node and may be expressed as follows.

$$C_i = \frac{e_i}{\frac{1}{2}k_i(k_i - 1)}, \tag{1}$$

$$C = \sum_{i=1}^{V} C_i.$$

where, $C_i$ is a local clustering coefficient of the $i^{th}$ vertex/node ($v_i$), $e_i$ is the number of edges between the neighbors of $v_i$, $k_i$ is the number of neighbors of $v_i$, and V is the total number of vertices. The global clustering coefficient (C) is a mean of all local coefficients.

A small-world constructed network is characterized by being relatively clustered ($C \gg C_{random}$) and maintaining a low characteristic path length ($L \geq L_{random}$). To build a small-world network, an iterative algorithm may be executed, where in each step, connected edges to a vertex may be removed with a probability p and reconnected to a new node selected by sampling from a uniform random distribution. Execution of the algorithm may be terminated when all edges in the original graph have been considered once. For any given probability p, a new network topology may be generated which may be characterized using L and C parameters.

Figure 2:
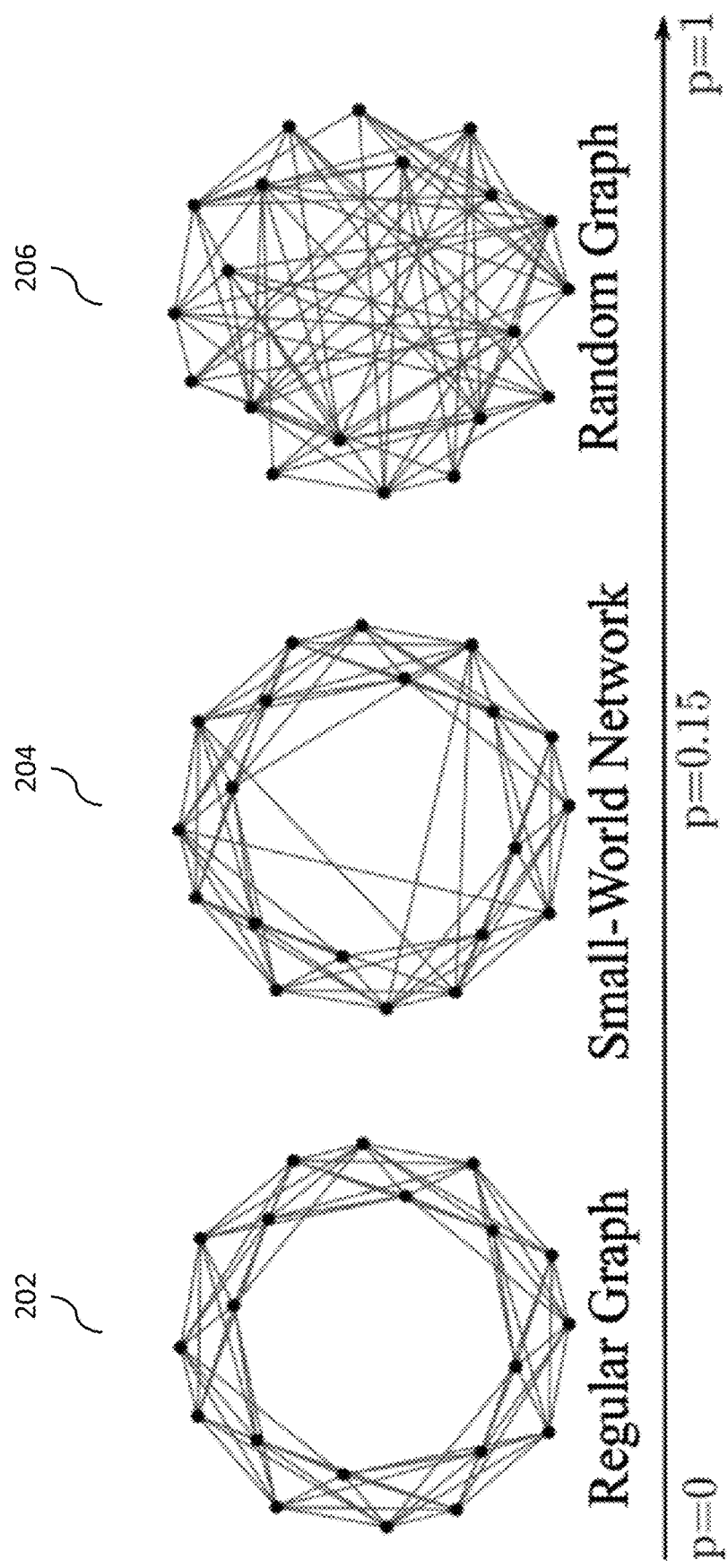
FIG. 2 illustrates an exemplary small world network compared to a regular network and a random graph.

FIG. 2 illustrates an exemplary small world network 204 as compared to a regular network 202 and a random graph 204. As, for example, is shown in FIG. 2, the regular network is a lattice with 20 nodes where each node is connected to its k=4 neighbors. The span of the generated (rewired) lattices increases as the rewiring probability p increases from 0 (regular lattice or network 202) to 1 (random graph 204).

Further, a graph is a small-world network if it has a similar characteristic path length but greater clustering of nodes than an equivalent Erdös-Re'nyi (ER) random graph with equal number of vertices and edges. For example, a network may be defined as small world if $S_G > 1$. Assuming, $L_G$ and $C_G$ are the characteristic path length and clustering coefficient of the original graph (G), respectively and the corresponding quantities for the pertinent ER random graph are denoted by $L_{rand}$ and $C_{rand}$. The following equation represents the quantitative measure, $S_G$, for the small-world property.

$$S_G = \frac{\gamma_G}{\lambda_G}, \gamma_G = \frac{C_G}{C_{rand}}, \lambda_G = \frac{L_G}{L_{rand}} \quad (2)$$

In some implementations, to construct a small-world network, an iterative rewiring process may be executed by the framework 104 (shown in FIG. 1) on the generated undirected baseline graph (generated by the graph extraction module 106 shown in FIG. 1), where all edges may be "visited" once and "rewired" with probability p. Each edge in the generated graph may be denoted with $e(v_i, v_j)$ where $v_i$ and $v_j$ may correspond to the start and end nodes and the subscripts i, j may indicate corresponding indices. In each step of the process, a vertex $v_{j'}$ may be selected (using module 112 as shown in FIG. 1) by executing sampling from a uniform random distribution with probability $$\frac{1}{|V_i^c|}$$

where $V_i^c$ is a set of nodes that are non-neighbor to the start node, $v_i$. The second node may be selected such that no self-loops and/or repeated links exist in the rewired network. Once the destination node is selected, the initial edge, $e(v_i, v_j)$, may be removed with probability p and replaced by $e(v_i, v_{j'})$. In the case where a vertex is connected to all other nodes in the graph ($V_i^c = 0$) no rewiring occurs.

Figure 3A:
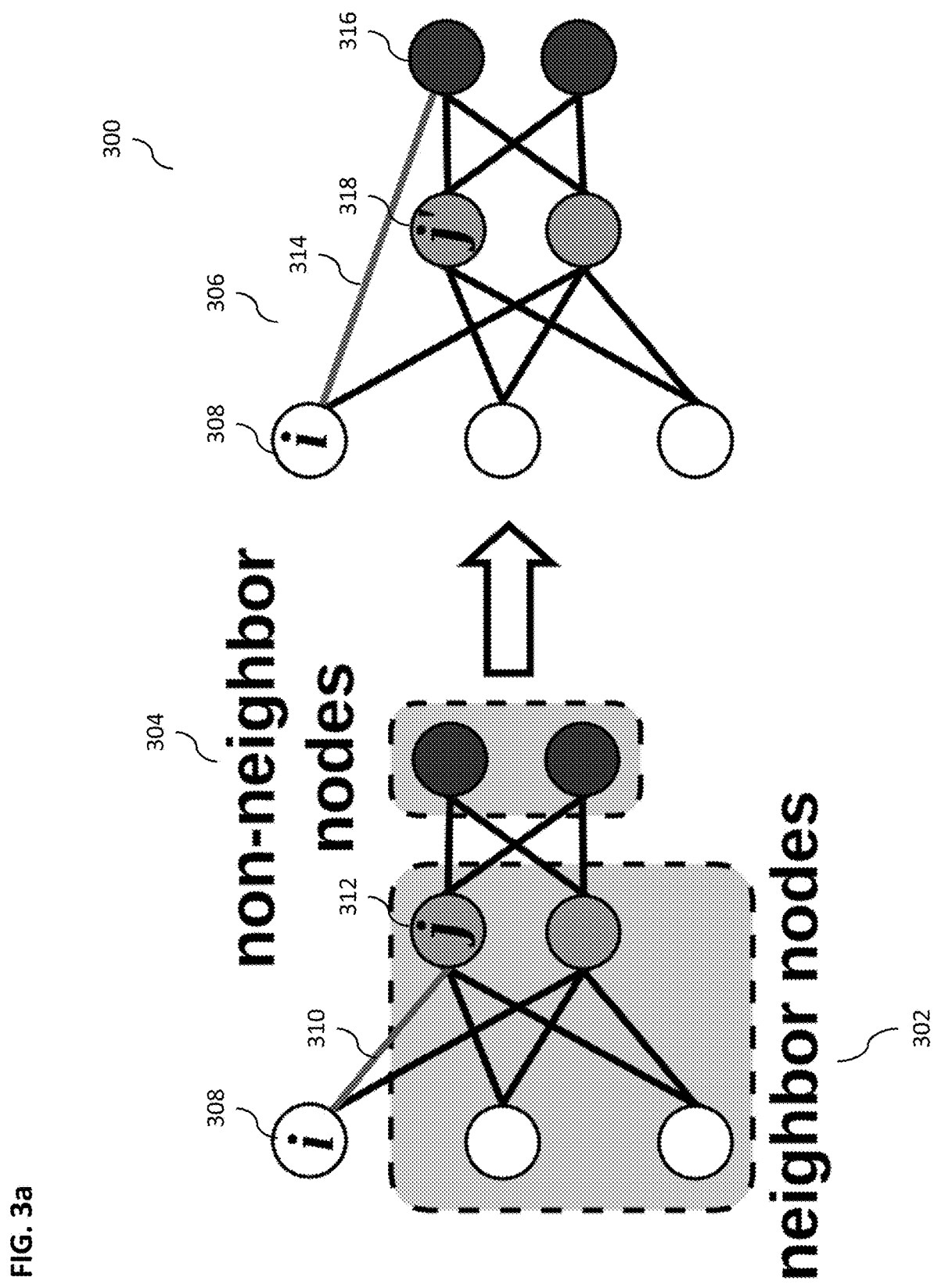
FIG. 3a illustrates an exemplary rewiring process, according to some implementations of the current subject matter.

FIG. 3a illustrates an exemplary rewiring process 300, according to some implementations of the current subject matter. A start node i 308 may be connected using an edge 310 to node j 312, where node 312 may be part of neighboring nodes 302 and may also be connected to one or more non-neighbor nodes 304. In accordance with the discussion above, using the process 300, the connections between nodes 308 and 312 may rewired or reconnected into new topology network 306. In particular, the node 308 may be disconnected from the node 312 and instead connected to node 316 using a new edge 314, where node 316 may be the new destination node. The edge 314 may be a long-range edge that may enable feature propagation as well as alleviate a vanishing gradient problem in the achieved small-world neural network.

FIG. 3b illustrates an exemplary code 320 that may be used to execute the rewiring process 300 shown in FIG. 3a, according to some implementations of the current subject matter. As shown in FIG. 3b, the process 300 may be executed using a neural network as a baseline model that is received by the graph extraction module 106 (shown in FIG. 1). In that regard, L may correspond to a total number of layers in the network, $E_{l,l+1}$ may be a set of edges connecting neurons in layer l to the succeeding layer (layer (l+1)), v with subscripts may correspond to vertices, where the subscripts indicate corresponding indices, and $e(v_i, v_j)$ may correspond to the undirected edge between vertices $v_i$ and $v_j$. In some exemplary, non-limiting implementations, one or more constraints (such as for use in a feed-forward architecture of neural networks) may be applied to the rewiring process. For example, one of the constraints may be that random rewiring must not remove all connections from one layer to the subsequent layer. Another constraint may be that for an edge connected between the $i^{th}$ and $(i+1)^{th}$ layer of the neural network, the destination vertex in the rewiring algorithm may be randomly selected from neurons located in the $(i+2)^{th}$ layer and/or after. Further, connections from the input layer to the first layer neurons may be unaffected (e.g., not added and/or removed). Also, all second-to-the last layer neurons may remain connected to the output layer.

Figure 3C:
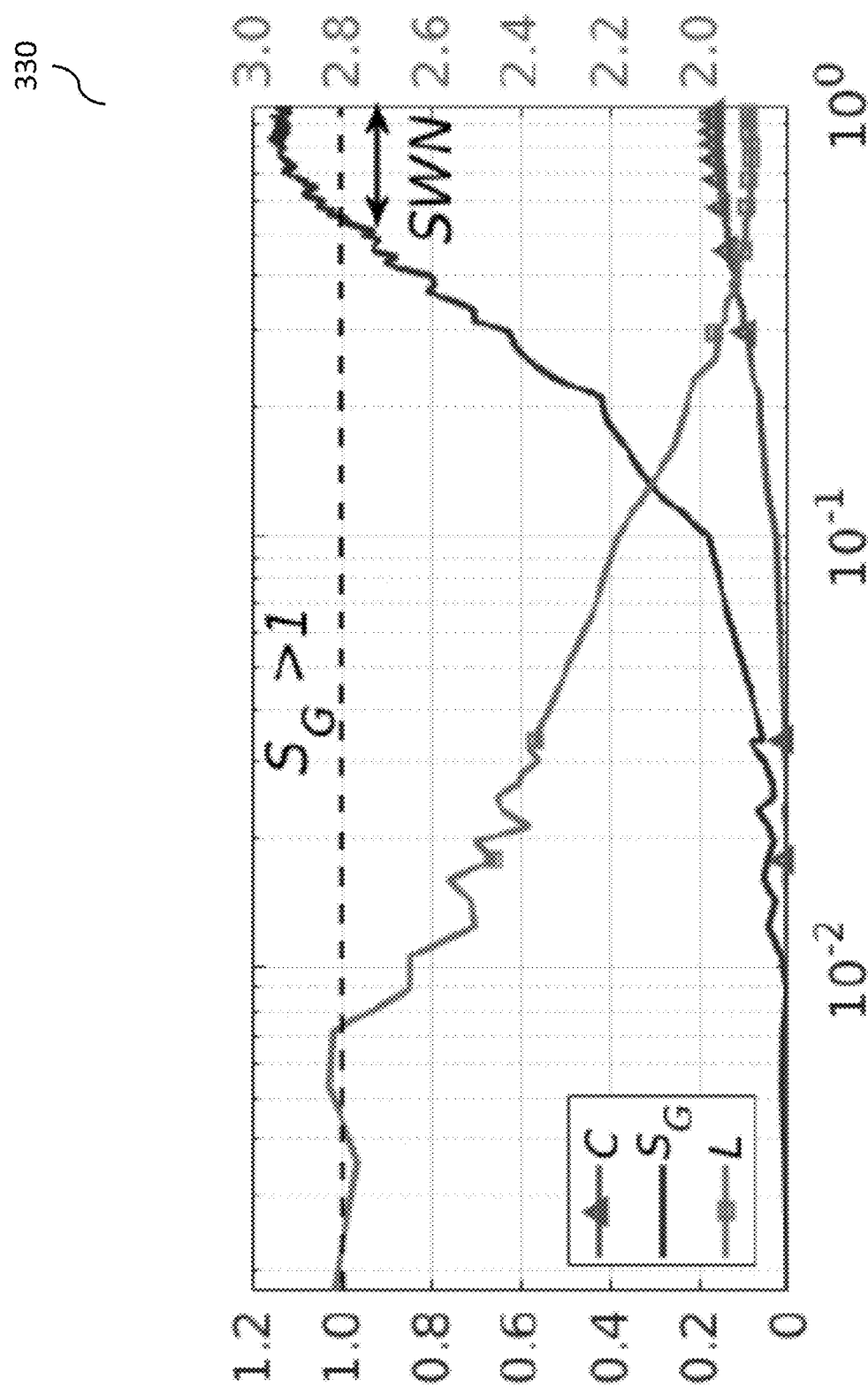
FIG. 3c illustrates an exemplary plot indicating a relationship between a clustering coefficient (C), small-world property ($S_G$), path length (L), and rewiring probability p for a 14-layer convolutional neural network.
Figure 3D:
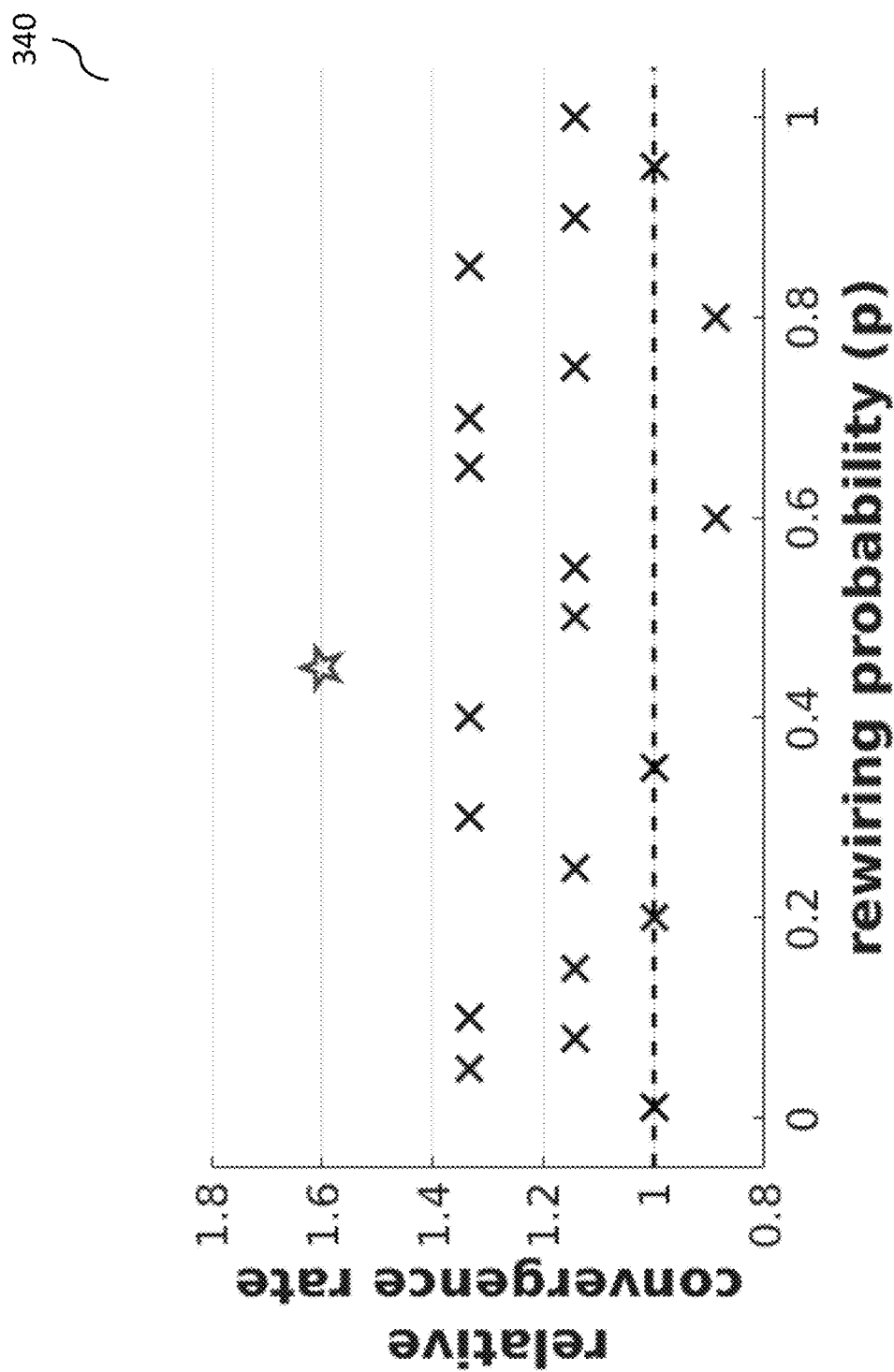
FIG. 3d illustrates an exemplary plot comparing relative convergence speeds of conventional neural network architectures and current subject matter's architecture/process (shown by a "star") versus rewiring probability p.

FIG. 3c illustrates an exemplary plot 330 indicating a relationship between a clustering coefficient (C), small-world property ($S_G$), path length (L), and rewiring probability p for a 14-layer convolutional neural network. In conventional CNNs, the clustering coefficient may be zero and the characteristic path length may be large specifically for very deep networks (leftmost points on FIG. 3c). As such, CNNs may be far from networks with the small-world property. Random rewiring may replace short-range connections to immediately subsequent layers with longer-range connections. Thus, coefficient L may be reduced while coefficient C may increase as the network shifts towards the small-world equivalent. Using the current subject matter process, a topology with the maximum value of small-world property, $S_G$, may be selected, resulting in a new network having an enhanced connectivity in the corresponding CNN, which in turn, may result in a better gradient propagation and training speed up. FIG. 3d illustrates an exemplary plot 340 comparing relative convergence speeds of conventional architectures and current subject matter's architecture/process (shown by a "star") versus rewiring probability p. Each network has been trained using MNIST dataset of handwritten digits (as available from http://yann.lecun.com/exdb/mnist) that has been constructed using a 5-layer CNN. As shown in FIG. 3d (by the "star"), the long-range connections (as shown by connection 314 in FIG. 3a) results in faster convergence speeds.

In some implementations, the current subject matter system 100 (shown in FIG. 1) may include an application programming interface (API) that may be used for receiving input of a high-level description of a neural network and to generate a corresponding small-world architecture. The API may be part of the computing framework 104 shown in FIG. 1. First, as stated above, the neural network model may be converted to an equivalent graph structure, where each vertex represents a neuron in the original neural network and the connections between subsequent layers are replaced with undirected edges. In order to opt for the graph with the small-world property, the API may iteratively execute the rewiring algorithm (as disclosed herein) for different rewiring probabilities and/or profiles of the characteristic path length and/or clustering coefficient of the generated graph at each step. As shown in FIG. 3c, the captured patterns for the clustering coefficient (C), path length (L) and rewiring probability p that directly affect the number of rewired edges within the network for a neural network model may be used to detect the small-world topology using the measure $S_G$. The current subject matter may then select the architecture with a maximum value of small-world property as the small-world equivalent for the input neural network.

Figure 4:
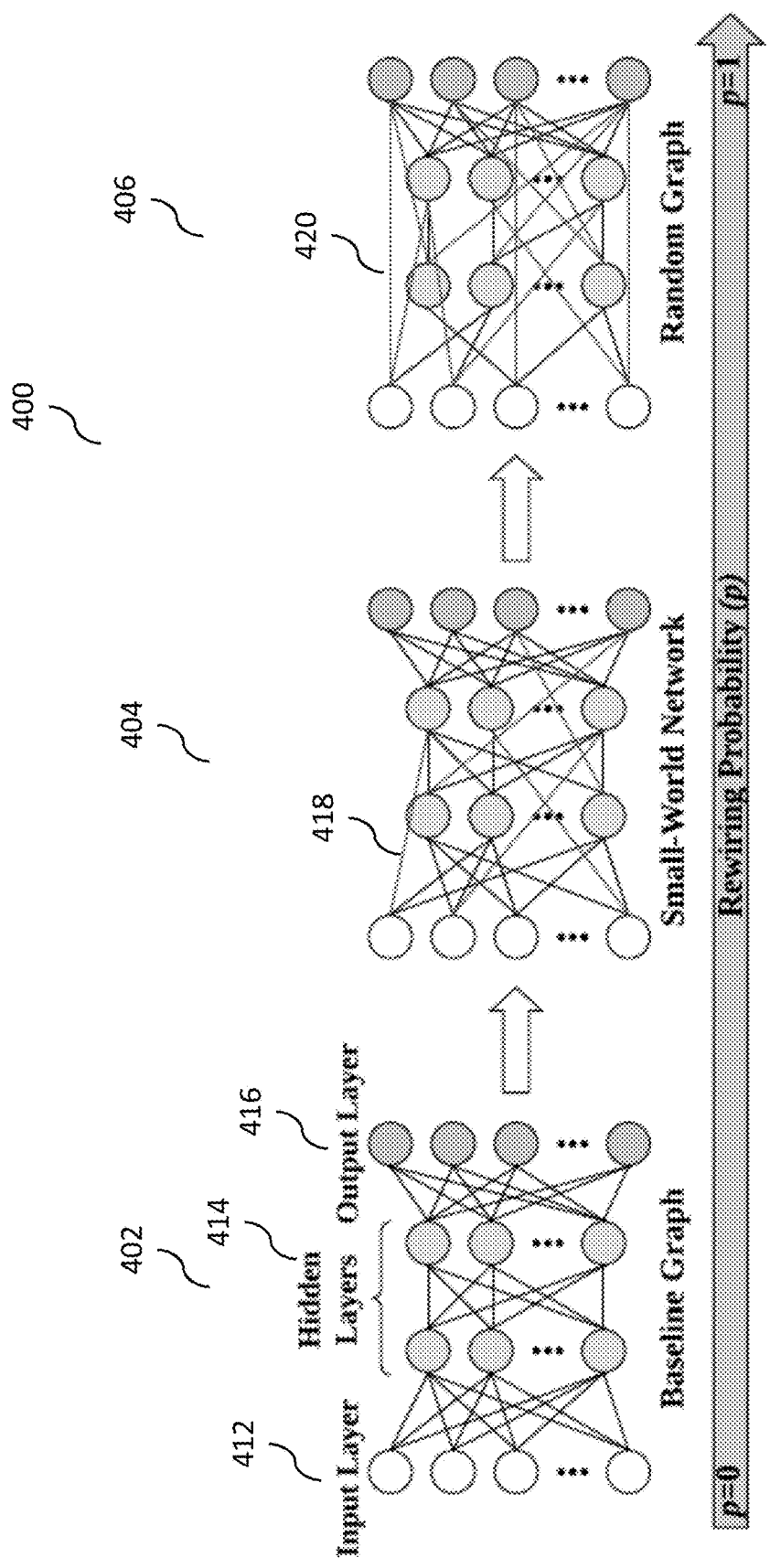
FIG. 4 illustrates an exemplary transition process from a baseline model graph to a small world network model to a random graph, according to some implementations of the current subject matter.

FIG. 4 illustrates an exemplary transition process 400 from a baseline model graph to a small world network model 402 to a random graph 406, according to some implementations of the current subject matter. The exemplary transition process 400 is shown for an exemplary four-layer neural network and a rewiring probability p∈[0,1] interval. The process 400 may start with a baseline graph 402 corresponding the received neural network description. The graph 402 may include an input layer 412, hidden layers 414, and output layer 416 (similar to structure shown in FIG. 3a). Each node belonging to a layer may have edges to all nodes within the immediately preceding and succeeding layer and no nodes with more than one layer distance may be connected. As such, the clustering coefficient is zero for the baseline neural network model architecture. By increasing the rewiring probability, short-edge connections may be gradually removed and long-range connections may be introduced in the topology (as shown by long range connection 418 in the small-world network 404 and long range connection 420 in the random graph 406). Thus, the characteristic path length may be reduced while the clustering coefficient may increase as the neural network may shift towards the small-world equivalent. Further, the total number of edges in the neural network may remain constant after rewiring. As such, the baseline neural network model may have the same number of parameters as the small-world counterpart.

A conventional feed-forward neural network architecture may include sequentially stacked layers with different functionalities where an output of one layer may be fed to the immediately preceding layer. Commonly used layers may be categorized in the following classes based on the nature of their operations: linear layers, e.g., convolutional (CONV), batch normalization (BN), fully-connected (FC), etc. and non-linear layers, e.g., activation (e.g., ReLU), maxpool (MP), etc. Neurons are typically associated with linear layers (e.g., CONV and FC) because they may perform a majority of computations within the neural network. In some exemplary implementations, the current subject matter system may be configured to perform rewiring of the linear layers (e.g., CONV and/or FC), however, as can be understood, rewiring of other types of layers may also be performed using processes described above.

Figure 5:
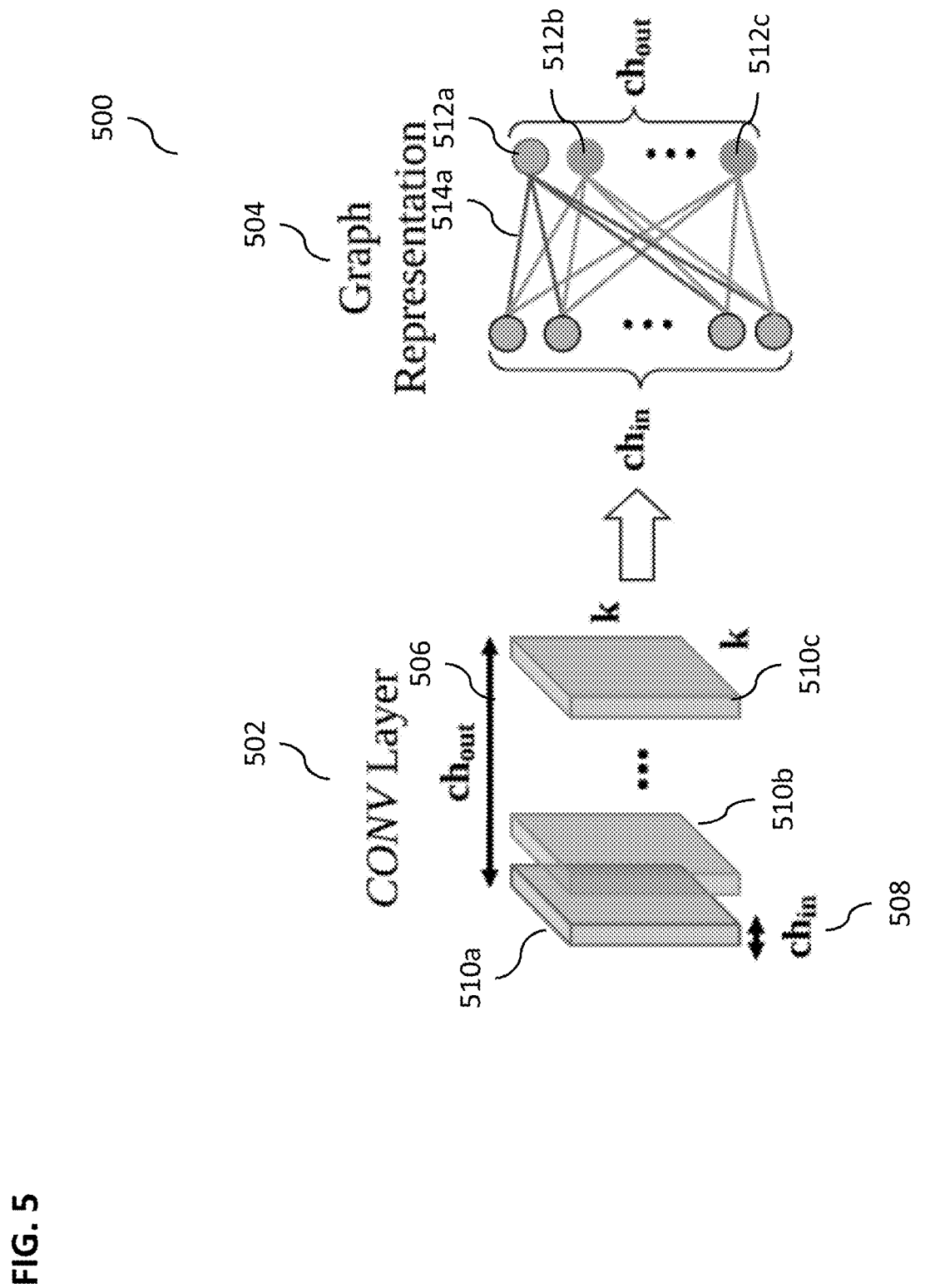
FIG. 5 an exemplary transformation of a convolutional layer into a graph representation, according to some implementations of the current subject matter.
Figure 6:
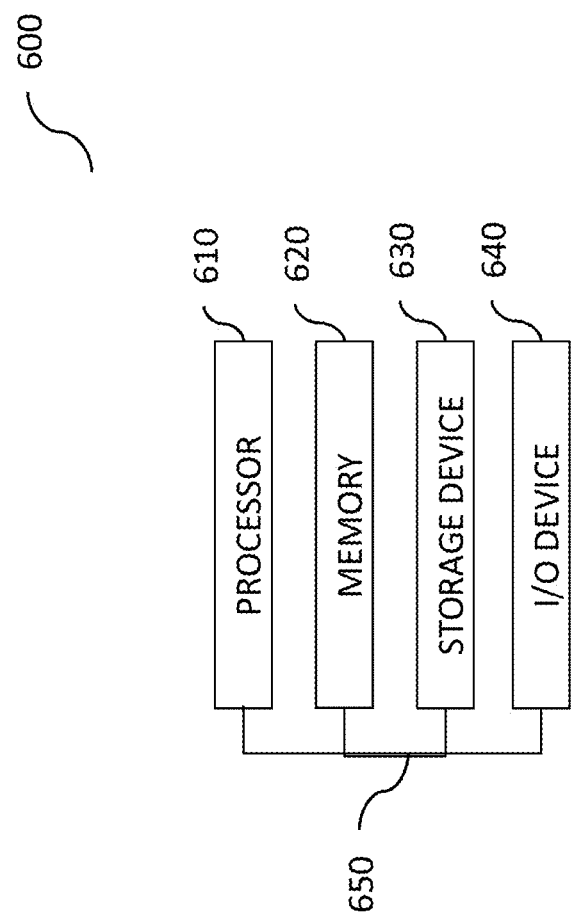
FIG. 6 illustrates an exemplary system, according to some implementations of the current subject matter.

In some implementations, referring to FIG. 5, CONV linear layers may sweep a k×k convolution kernel across an input tensor of dimensionality $W_{in} \times H_{in} \times ch_{in}$ to generate an output feature map with dimensions $W_{out} \times H_{out} \times ch_{out}$, where $ch_{in}$ and $ch_{out}$ may correspond to the number of input and output channels, respectively. As shown in FIG. 5, CONV layer 502 may be transformed into graph representation 504, as described above. The CONV layer 502 may include input channels 508 and output channels 506 having layers 510 (a, b, c). As can be understood, input and output channels may be any other type of channels (e.g., a first channel and a second channel). In the graph representation 504, the nodes 512 (a, b, c) in the output channel may correspond to the layers 510 (a, b, c), respectively. A parameter space for a CONV layer may include of $k \times k \times ch_{in} \times ch_{out}$ values. In order to generate the graph equivalent 504 of layer 502, each k×k kernel may be represented by a single edge (e.g., edge 514a corresponding to the layer 510a and node 512a) in the graph 504.

In some implementations, to translate the newly generated graph (with new connections) to a new neural network model, similar to the procedure performed to convert the neural network layers to their corresponding graph representation, each edge in the rewired graph may be interpreted as a kernel between the corresponding neural network layers. As a result of this assumption, each small-world neural network layer may have a set of multiple feature map channels as its input, each of which may be produced by a different succeeding layer.

For example, assuming an input to a neural network layer l is $x_l$, the linear operations performed by CONV and/or FC layers is $H_l(.)$, where the corresponding generated output is $z_l$. An output of each layer may pass through optional BN and/or MP layers and undergo a non-linear activation function to generate $y_l$ which may then be used as an input to the succeeding layer: $x_l+1=y_l$. Hence, for a conventional feed-forward neural network, an output of each layer may be expressed as a function of its input:

$$z_l = H_l(x_l) \tag{4}$$

In a small-world neural networks, each layer's output not only depends on its input but may also be a function of all prior layer's inputs:

$$z_l = H_l(x_l) + \sum_{l'} H_{l \to l'}(x_{l'}) \tag{5}$$

In this case, l' is an iterator for all layers succeeding layer l and $x_{l'}$ is the input to the corresponding layer. The function $H_{l \to l'}$ is a sparse weight matrix that may be built based upon the rewired small-world graph. For example, for an FC layer, if a vertex i of layer l is connected to vertex j of layer l' in the graph representation, $H_{l \to l'}$ may have nonzero values in the $ij^{th}$ element. Such intertwined connectivity among layers in a small-world neural network may ensure enhanced data flow within the network while avoiding unnecessary parameter utilization as a result of the sparse inter-layer weight kernels.

FIG. 10 depicts a block diagram illustrating a system 1000 consistent with implementations of the current subject matter. The system 1000 may be used to host the neural networks discloses herein. The system 600 may include a processor 610, a memory 620, a storage device 630, and input/output devices 640. The processor 610 is capable of processing instructions for execution within the system 600.

In some implementations, the processor 610 can be a single-threaded processor, a multi-threaded processor, and/or a graphics processor unit (GPU). The processor 610 is capable of processing instructions stored in the memory 620 and/or on the storage device 630 to display graphical information for a user interface provided via the input/output device 640, such as a screen, keyboard, and/or other input/output devices. The memory 620 is a computer readable medium such as volatile or non-volatile that stores information within the system 600. The memory 620 can store instructions and/or other data associated with the processes disclosed herein. The storage device 630 is capable of providing persistent storage for the system 600. The storage device 630 can be a floppy disk device, a hard disk device, an optical disk device, a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces. According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

Figure 7:
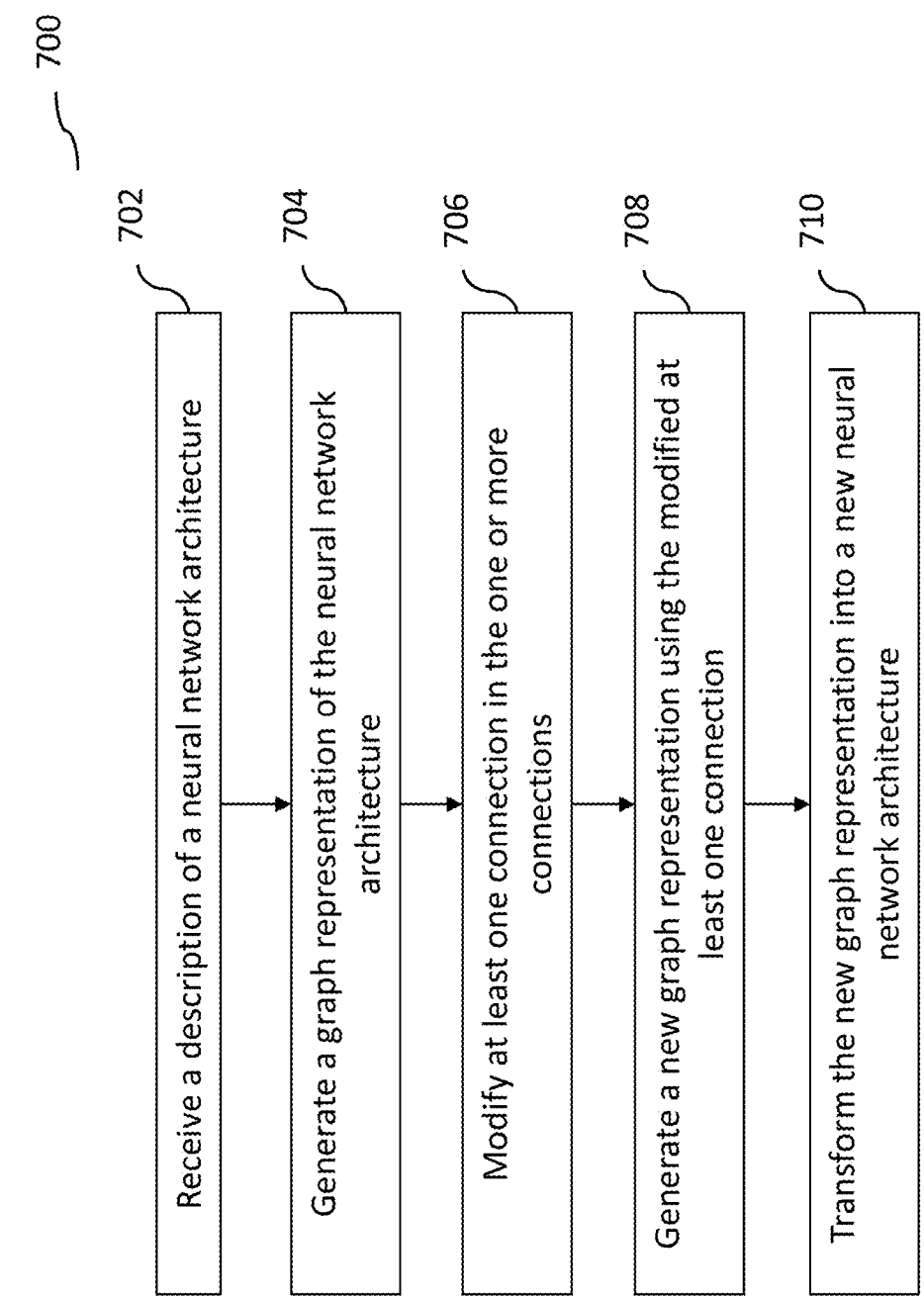
FIG. 7 illustrates an exemplary method, according to some implementations of the current subject matter.

FIG. 7 illustrates an exemplary computer implemented method 700, according to some implementations of the current subject matter. At 702, a description of a neural network architecture may be received by the computing framework 104, as shown in FIG. 1.

At 704, a graph representation of the neural network architecture may be generated based on the received description. The graph representation may include one or more nodes connected by one or more connections (e.g., as shown in FIG. 3*a*).

At 706, at least one connection in the plurality of connections may be modified (e.g., connection 310 is changed to connection 314 as shown in FIG. 3*a*). The new graph representation may have a small-world property (as, for example, discussed above with regard to FIGS. 2 and 3*c*).

At 708, a new graph representation may be generated using the previous graph representation and the modified connection (e.g., rewired graph 306 as shown in FIG. 3*a*). At 710, the new graph representation may be transformed into a new neural network architecture.

In some implementations, the current subject matter may include one or more of the following optional features. In some implementations, the modification of connections may be executed based on a predetermined probability (e.g., a measure in a graph theory). The probability may be selected in an interval between 0 and 1.

The method may further include repeating the modifying for each connection in the one or more connections, and generating the new graph presentation having a maximum small-world property selected from a plurality of small-world properties determined for each new graph representation based on the repeating for a plurality of probabilities in the interval between 0 and 1. In some implementations, the description of the neural network architecture may include a plurality of layers having a plurality of neurons. Each neuron may correspond to a node in the generated graph representation and the connections may include connections between one or more layers in the plurality of layers.

In some implementations, a connection may be between a first input node and a first output node in the plurality of nodes. The modified connection may be between the first input node and a second output node in the plurality of nodes (e.g., as shown in FIG. 3*a*). The modified connection may be longer than the original connection. The modified connection may be selected using the predetermined probability and one or more constraints.

In some implementations, the new neural network architecture may correspond to a small-world neural network. Further, a total number of the connections in the graph representation may be equal to a total number of connections in the new graph representation.

In some implementations, an application programming interface may be configured to perform at least one of the receiving, the generating the graph representation, the modifying, the generating the new graph representation, and the transforming.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method, comprising:
receiving, by one or more processors, a description of a neural network architecture;
generating, by the one or more processors, based on the description, a graph representation of the neural network architecture, the graph representation comprising one or more nodes connected by one or more connections;
modifying, by the one or more processors, at least one connection in the one or more connections to optimize a topology of the neural network architecture as identified through an iterative rewiring process;
generating, by the one or more processors, based on the graph representation, a new graph representation using the at least one connection, wherein the new graph representation has a small-world property; and
transforming, by the one or more processors, the new graph representation into a new neural network architecture possessing a minimum mixing time.

2. The method of claim 1, wherein the modifying the at least one connection is executed based on a predetermined probability, wherein the predetermined probability is selected in an interval between 0 and 1.

3. The method according to of claim 2, further comprising modifying each connection in the one or more connections; and
generating the new graph representation having a maximum small-world property selected from a plurality of small-world properties determined for each new graph representation based on a plurality of probabilities in the interval between 0 and 1.

4. The method of claim 1, wherein the description of the neural network architecture comprises a plurality of layers having a plurality of neurons, wherein each neuron corresponds to a node in the graph representation and the one or more connections comprise connections between one or more layers in the plurality of layers formed in a small-world graph representation.

5. The method of claim 3, wherein
the at least one connection is between a first input node and a first output node in a plurality of nodes comprising the one or more nodes; and
the at least one connection is between the first input node and a second output node in the plurality of nodes, wherein the at least one connection is selected using the predetermined probability and one or more constraints.

6. The method according to of claim 5, wherein the at least one connection is longer than the at least one connection.

7. The method of claim 3, wherein the new neural network architecture corresponds to a small-world neural network.

8. The method of claim 1, wherein a total number of the one or more connections in the graph representation is equal to a total number of one or more connections in the new graph representation.

9. The method according to claim 1, wherein an application programming interface is configured to perform at least one of receiving the description of the neural network architecture, generating of the graph representation, modifying, the generating of the new graph representation, and transforming to the new neural network architecture.

10. A system comprising:
at least one programmable processor; and
a non-transitory machine-readable medium storing instructions that, when executed by the at least one programmable processor, cause the at least one programmable processor to perform operations comprising:
receiving a description of a neural network architecture;
generating, based on the description, a graph representation of the neural network architecture, the graph representation including one or more nodes connected by one or more connections;
modifying at least one connection in the one or more connections to optimize a topology of the neural network architecture as identified through an iterative rewiring process;
generating, based on the graph representation, a new graph representation using the at least one connection, wherein the new graph representation has a small-world property; and
transforming the new graph representation into a new neural network architecture possessing a minimum mixing time.

11. The system of claim 10, wherein the modifying the at least one connection is executed based on a predetermined probability, wherein the predetermined probability is selected in an interval between 0 and 1.

12. The system of claim 11, wherein the operations further comprise
modifying each connection in the one or more connections; and
generating the new graph representation having a maximum small-world property selected from a plurality of small-world properties determined for each new graph representation based on a plurality of probabilities in the interval between 0 and 1.

13. The system of claim 10, wherein the description of the neural network architecture includes a plurality of layers having a plurality of neurons, wherein each neuron corresponds to a node in the graph representation and the one or more connections include connections between one or more layers in the plurality of layers formed in a small-world graph representation.

14. The system of claim 12, wherein
the at least one connection is between a first input node and a first output node in a plurality of nodes comprising the one or more nodes; and
the at least one connection is between the first input node and a second output node in the plurality of nodes, wherein the at least one connection is selected using the predetermined probability and one or more constraints.

15. The system of claim 14, wherein the modified at least one connection is longer than the at least one connection.

16. The system of claim 12, wherein the new neural network architecture corresponds to a small-world neural network.

17. The system of claim 10, wherein a total number of the one or more connections in the graph representation is equal to a total number of one or more connections in the new graph representation.

18. The system of claim 10, wherein an application programming interface is configured to perform at least one of receiving description of the neural network architecture, generating of the graph representation, modifying, the generating of the new graph representation, and transforming to the new neural network architecture.

19. A computer program product comprising a non-transitory machine-readable medium storing instructions that, when executed by at least one programmable processor, cause the at least one programmable processor to perform operations comprising:
  receiving a description of a neural network architecture;
  generating, based on the description, a graph representation of the neural network architecture, the graph representation including one or more nodes connected by one or more connections;
  modifying at least one connection in the one or more connections to optimize a topology of the neural network architecture as identified through an iterative rewiring process;
  generating, based on the graph representation, a new graph representation using the at least one connection, wherein the new graph representation has a small-world property; and
  transforming the new graph representation into a new neural network architecture possessing a minimum mixing time.

20. The computer program product of claim 19, wherein the modifying the at least one connection is executed based on a predetermined probability, wherein the predetermined probability is selected in an interval between 0 and 1.

* * * * *